Figure 1:
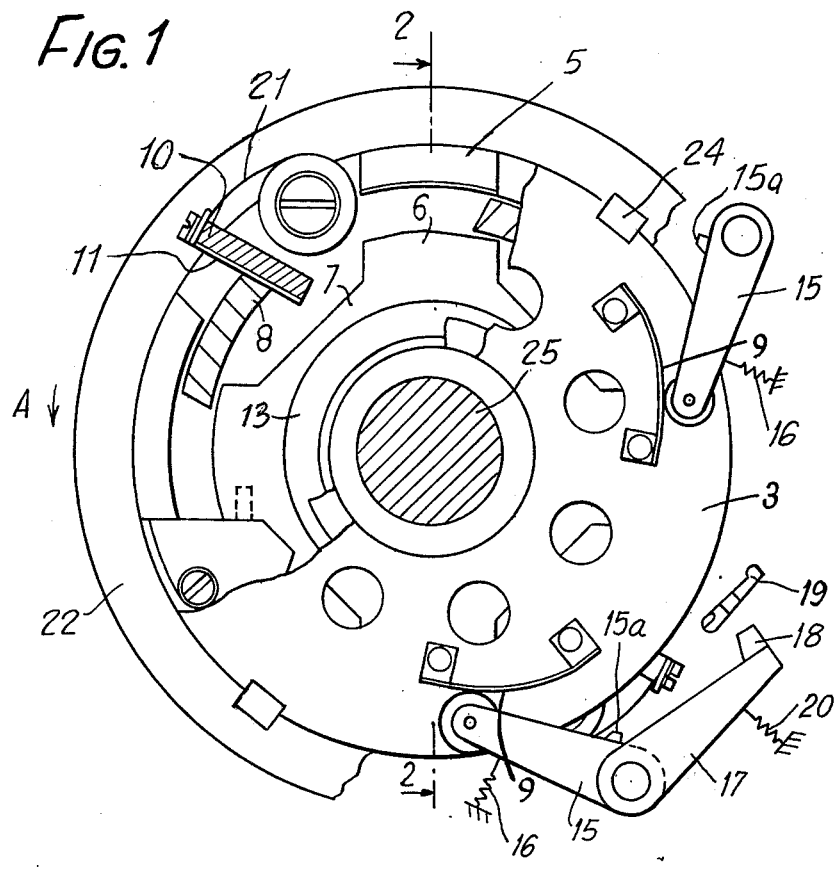

United States Patent
Jones

[11] 3,879,624
[45] Apr. 22, 1975

[54] ROTARY SOLENOIDS IN BRUSH-APPLICATION GEAR

[75] Inventor: Frederick Raymond Jones, Brentwood, England

[73] Assignee: Plessey Handel und Investments A.G., Zug, Switzerland

[22] Filed: Apr. 24, 1973

[21] Appl. No.: 354,064

[30] Foreign Application Priority Data
May 4, 1972 United Kingdom............... 20867/72

[52] U.S. Cl................................... 310/240; 290/46
[51] Int. Cl.............................................. H02k 13/00
[58] Field of Search... 310/245, 14, 30, 247, 34–39, 310/40, 240, 239, 241, 244, 246, 268, 219, 229, 148, 230, 232–236; 290/46

[56] References Cited
UNITED STATES PATENTS

| | | | |
|---|---|---|---|
| 2,446,297 | 8/1948 | Nardone | 310/246 |
| 2,753,477 | 7/1956 | Yahn | 310/244 |
| 2,780,949 | 2/1957 | Hoy | 310/240 |
| 2,906,939 | 9/1959 | Rice | 310/244 |
| 3,278,777 | 10/1966 | Grooms | 310/240 |
| 3,590,262 | 6/1971 | Sheffield | 310/240 |
| 3,610,978 | 10/1971 | Hermann | 310/268 |

*Primary Examiner*—R. Skudy
*Attorney, Agent, or Firm*—Scrivener, Parker, Scrivener & Clarke

[57] ABSTRACT

In order to retain the rotary brush-application solenoid of a starter-brush lifting mechanism in brush-application position, even under considerable reduction of the solenoid-energising voltage such as may be due to heavy starting current, the rotor is equipped with retention poles which are moved by the solenoid applying rotation into contact with the end faces of the inner and outer stator poles between which the rotor poles enter so as to form magnet armatures which retain the rotor, by strong magnetic forces, against reverse rotation. The solenoid energising voltage at which release takes place is determined by the thickness of shims interposed between the leading end faces of each retention pole and the said end of the stator poles. Conveniently the shims are clamped between each retention pole end of the rotor pole to which the retention pole is attached.

5 Claims, 4 Drawing Figures

ROTARY SOLENOIDS IN BRUSH-APPLICATION GEAR

This invention relates to what is known as solenoid-operated brush-application gear, also known as brush-lifting devices, for electrical machines, and it has for an object to provide an improved rotary solenoid for such a brush-lifting device, which is particularly suitable for application to an electric engine-starter motor which is intended to continue running after the starting of an engine, for example because its armature is arranged thereafter to be utilised for the generation of electric current. The invention relates more specifically to brush-lifting devices of the kind, hereinafter referred-to as the kind specified, in which brush-lifting spring means are provided which maintain the brushes clear of the commutator except when a rotary solenoid is energised to apply, or to allow brush-application spring means to apply, the brushes to the commutator, the rotary solenoid having a stator provided with a set of outer pole pieces spaced circumferentially of the solenoid, a set of inner pole pieces, similarly spaced circumferentially and arranged to face the outer pole pieces across a radial gap, a magnetising winding arranged to produce a magnetic field by which the inner and outer stator pole pieces are respectively magnetised with opposite polarities, and a rotor member having a set of magnetisable pole pieces which are spaced circumferentially at an angular pitch corresponding to that of the stator pole pieces, so that rotation of the rotor from a normal position to an operative position will cause each rotor pole piece to enter the gap between an inner stator pole piece and the corresponding outer stator pole piece.

One convenient form of brush-lifting device of the kind specified includes a brush-lifting element which is biased by brush-lifting spring means to a position of engagement with the brush mechanism to lift the brushes off the commutator against the action of brush-application springs, and a rotary solenoid which when energised moves the brush-lifting element against the action of the brush-lifting spring means so as to allow the brushes to be placed into contact with the commutator by the brush-application springs while withdrawing the brush-lifting element from operative engagement with the brush mechanism. Although some known constructions of brush-lifting gear of the kind specified, for example a construction described in U.S. Pat. No. 3,590,262 will produce adequate solenoid-rotor torque for reliable completion of the brush-engagement movement, it has been found that when in such known construction, upon engagement of the commutator brushes with the commutator, the commutator current is switched-on to produce starting current, the resultant heavy load on the supply system is liable, under unfavourable circumstances, to lower the supply voltage to a value at which the spring loading of the solenoid rotor overcomes the magnetic holding force of the rotary solenoid with the result of a temporary decrease of the brush-application pressure or even of temporary complete lifting of the brushes off the commutator. This is, for example, liable to occur when starting from a battery nearing exhaustion, especially at low ambient temperatures, and the present invention has for a more specific object to provide improved brush-lifting devices by which this risk is considerably reduced.

According to the present invention the solenoid rotor is provided with auxiliary pole pieces, hereinafter called retention poles, which extend radially beyond the limits of the gap between the inner and outer stator pole pieces, and which have end faces which face these stator pole pieces in the direction of rotor movement in such manner as to reach a position of near-contact with the adjacent end faces of these pole pieces when the rotor is in its operative position corresponding to full brush engagement. In this position the retention poles will thus produce a strong magnetic force tending to retain the solenoid armature in this position against the action of the bias spring means, while when the rotor is in any other position the influence of the retention poles upon the rotor torque characteristic is so small that is can generally be ignored for practical purposes. It has been found in practice that when such retention poles are provided, the solenoid armature will not release the brushes unless and until the voltage applied to the solenoid-magnetised winding is reduced to a very low value, much lower than is likely to occur in practice as a result of any combination of adverse operating conditions. Means are preferably provided which ensure that a residual gap in the ferromagnetic circuit remains between each retention pole and the stator pole surfaces to ensure that release will take place when the voltage applied to the magnetising winding is reduced below a predetermined low value, and the accurate maintenance of such a gap is preferably ensured by the use of a thin non-magnetic lining on one of the mutual facing surfaces, this lining being preferably attached to the appropriate face of each retention pole.

Figure 2:
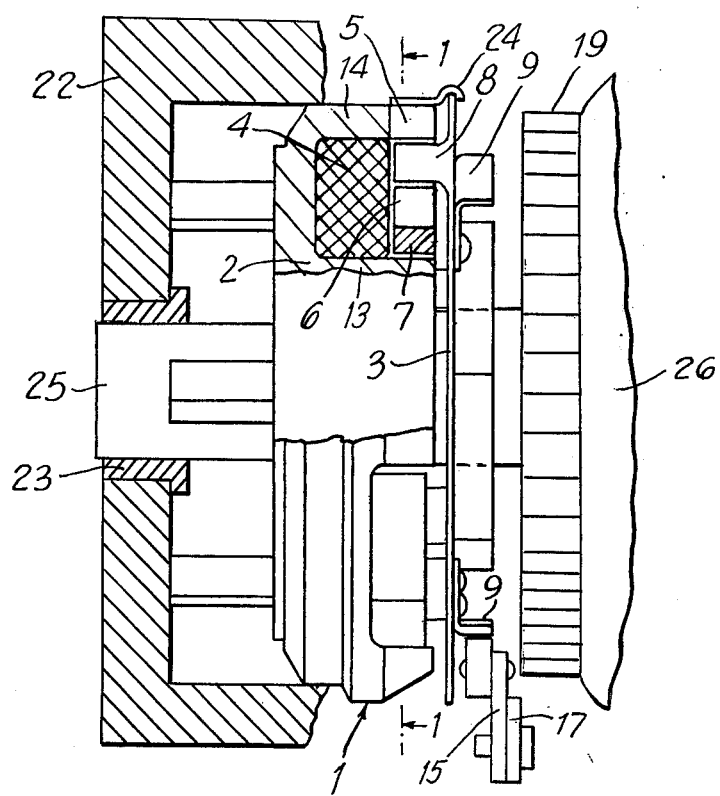
Figure 3:
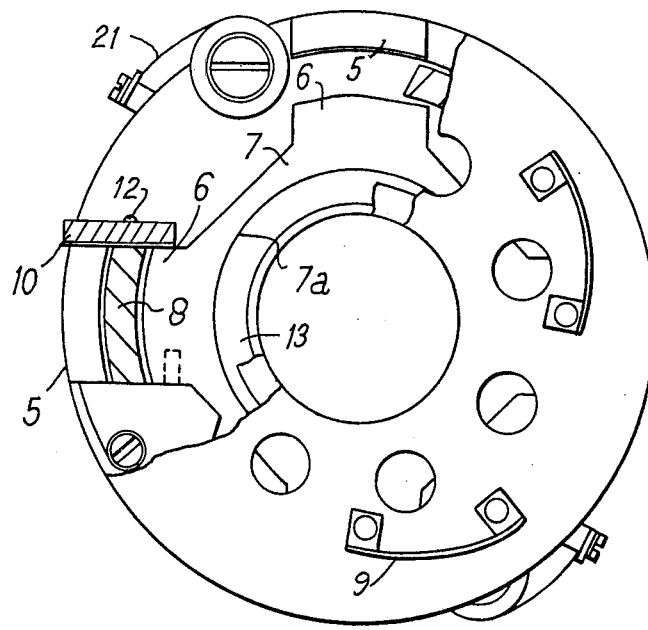
Figure 4:
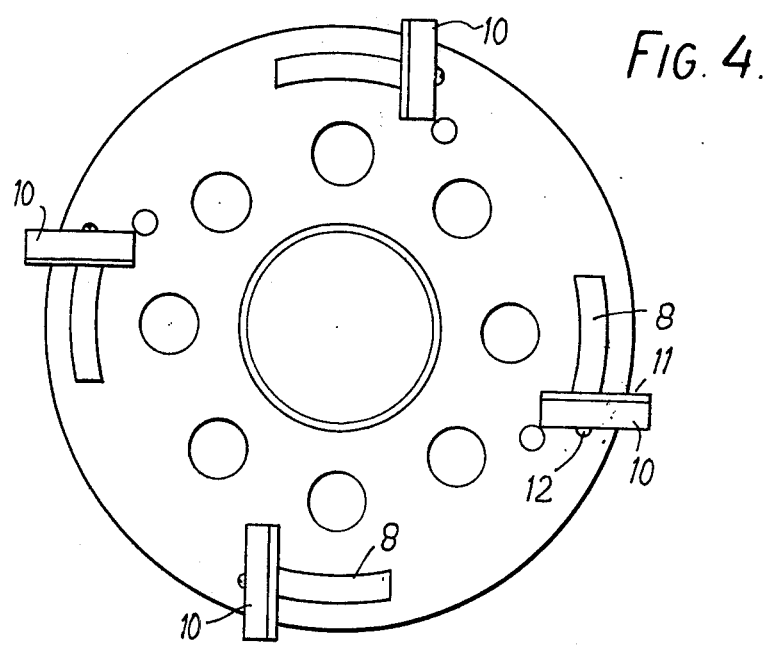

In order that the invention may be more readily understood, an embodiment will now be described with reference to the accompanying drawings, in which FIG. 1 is an end view of a brush-lifting solenoid device, partly in section on line 1—1 of FIG. 2, which shows the device in its normal position, together with a diagrammatic representation of the brush-lifting mechanism, FIG. 2 is a side elevation thereof, partly in section on line 2—2 of FIG. 1, FIG. 3 is a view similar to FIG. 1 but without the brush-lifting mechanism showing the solenoid device in the energised or brush-engagement position, and FIG. 4 is an end view of the solenoid rotor.

Referring now first to FIGS. 1 and 2, the illustrated brush-lifting device comprises a rotary solenoid 1 whose stator body 2 is sustantially annular and has a laterally facing U-profile. This stator body is arranged to be mounted in the housing 22 of an electrical machine whose rotor 26 is equipped with a commutator 19 and has a shaft 25 rotatably supported in the housing 22 by bearings 23. The open side of the U-profile of the stator 2 of the brush-lifting device faces a rotor plate 3, which is supported by brackets 24 so as to be rotatable about the axis of the annulus. Accommodated inside the U-profile at the bottom of the U is a magnetising winding 4 so arranged that when this winding is energised with direct current, the radially inner wall 13 of the U-profile becomes a north pole and the radially outer wall 14 of the U-profile becomes a south pole, or vice versa. A portion of the depth of the U-profile, adjacent to the rotor plate 3, is left free of windings, and the corresponding part of the outer wall 14 of the U-profile is castellated, forming a number of axially projecting portions 5 which are uniformly spaced round the circumference to form outer stator-pole pieces, while the part of the circumferential wall between these pole pieces is removed. Facing the radially inner surface of these pole pieces 5, at a radial distance approximately equal to the radial thickness of the pole pieces 5, are inner stator pole pieces 6, which each radially face one of the outer pole pieces 5 and extend over approximately the same angle of the circumference as the latter. These inner pole pieces project outwardly from the circumference of the flat annular member 7, whose axial thickness approximately corresponds to the axial length of the outer pole pieces 5. This flat member 7 has a central hole 7a fitted on the outer circumference of the inner wall 13 of the U-profile annulus member 2. Fixed to the rotor plate 3, at that side thereof which faces the U-profile annulus member 2, are rotor pole pieces 8 each forming circumferentially spaced parts of an annulus which is coaxial with the rotor plate 3 and fits with small radial clearance between the inner and outer stator pole pieces 5 and 6, the rotor pole pieces 8 being spaced round the axis of the rotor plate 3 at the same angular pitch as the stator pole pieces 5 and 6. Like the stator poles 5 and 6, the rotor pole pieces 8 are of magnetisable material so that, when the winding 4 is energised, they will be subjected to magnetic forces which tend to turn the rotor plate in the direction of the arrow A from the normal position illustrated in FIG. 1 to a brush-engagement position in which each rotor pole 8 substantially fills the gap between a pair of stator poles 5 and 6. This brush-engagement position is illustrated in FIG. 3.

At its side facing away from the stator body 2, the rotor plate 3 is equipped with cam elements 9 which are arranged to engage brush-lifting members, in a known or convenient manner so as to ensure, engagement of the commutator brushes with the commutator when, upon energisation of the solenoid winding 4, the rotor plate 3 is thus turned from its normal position to its brush-engagement position.

Brush-lifting mechanism capable of performing the functions required in a brush-lifting device of the kind specified is diagrammatically shown in FIG. 1, but it should be clearly understood that I make no claim to any features of this particular construction of the brush-lifting mechanism except for its being representative of mechanism capable of performing the required functions.

The illustrated mechanism includes a brush-lifting element 15, which is biassed by brush-lifting spring means 16 into engagement, at 15a, with a brush carrier 17, to lift its brush 18 off a commutator 19 against the action of a brush-application spring 20. When the winding 4 of the rotary solenoid is energised, the resulting rotary displacement of the solenoid rotor member 3 against the action of a return spring 21 will cause one of the cams 9 of the solenoid rotor 3 to move the brush-lifting element 15, against the action of the brush-lifting spring means 16, so as to withdraw the brush-lifting element 15 from operative engagement with the brush carrier 17, thus allowing the brush 18 to be placed into contact with the commutator 19 by the brush-application spring 20. In order to prevent this engagement, once it has been achieved from being relaxed, by such drop in the operating voltage as is liable to occur when starting current is supplied to the commutator, each of the rotor-pole pieces 8 is equipped with an auxiliary pole piece 10, hereinafter called a retention pole, which is attached, with the interposition of shims 11 of non-magnetic material, by a screw 12 to the trailing end (as regards movement in the direction of arrow A) of the rotor pole piece 8, and which radially extends beyond the thickness of the rotor pole piece 8 at both the inner and outer circumference of the latter in such a manner that, when the rotor pole piece 8 completes its movement into the gap between a pair of inner and outer stator poles 5 and 6 for engagement of the commutator brushes, the projecting portions of the retention pole 10 will come face to face with the end faces of the inner and outer stator poles 5 and 6 as shown in FIG. 3, thus providing a magnetic-flux connection between these poles, whose magnetic reluctance rapidly decreases to a very low value as the rotor approaches its final position of full brush engagement, will then be held strongly in this brush-engagement position by the magnetic flux which the retention pole conducts between these inner and outer pole pieces.

In order to limit approach of the retention poles 10 to the end faces of the stator pole pieces 5 and 6, that side of each retention pole 10 which faces the stator pole pieces, is covered as shown in FIG. 4, with a non-magnetic shim 11 of suitable thickness which also magnetically separates the retention pole 10 from the end of the rotor pole piece proper 8, to which the retention pole 10 may be secured by screws 12.

It will be readily appreciated that when the rotor is fully in its brush-engagement position illustrated in FIG. 3, so that brushes are fully applied to the commutator, each of the retention poles 10 rests, with the interposition only of the non-magnetic shim 11, against the adjacent side faces of the pair of stator poles 5 and 6, a full stop. The low-reluctance magnetic path thus provided will, even at low energisation voltages of the winding 4, produce a strong retention force to oppose any rotation of the solenoid rotor in the direction which would reduce the application pressure of the brushes, and that the thickness of the non-magnetic shims employed will determine the voltage at which the solenoid will release.

What we claim is:

1. A device for applying brushes to the commutator of an electrical starter motor, which comprises brush-lifting spring means which normally maintain the brushes clear of the commutator, and a rotary solenoid having a stator and a rotor member rotatable relative thereto about an axis of rotation and operative, when the solenoid is energised, to cause application of the brushes to the commutator against the action of said spring means, said rotary solenoid, said stator including a set of outer pole pieces spaced circumferentially about said axis, a set of inner pole pieces, similarly spaced circumferentially about said axis and arranged to respectively face the outer pole pieces across a radial gap, a magnetising winding arranged to produce a magnetic field by which all the inner stator pole pieces and all the outer stator pole pieces are magnetised with respectively opposite polarities, and said rotor member having a set of magnetisable pole pieces which are spaced circumferentially about said axis at an angular pitch corresponding to that of the stator pole pieces so that rotation of the rotor from a normal position to an operative position will cause each rotor pole piece to enter the gap between an inner stator pole piece and the corresponding outer stator pole piece, said rotor member being equipped with auxiliary pole pieces each of which extends radially from the trailing end of one of said rotor pole pieces beyond both limits of the gap between the inner and outer stator pole pieces to face the ends of an inner and an outer stator pole piece so that at the completion of rotor movement to said operative position the auxiliary pole piece reaches a position of near-contact with the said ends of the stator pole pieces.

2. A device as claimed in claim 1, wherein movement-limiting means are provided which terminate movement of the auxiliary pole pieces when a residual gap in the ferromagnetic circuit is left between each auxiliary pole piece and the co-operating stator-pole end surfaces.

3. A device as claimed in claim 2, wherein the movement-limiting means include a thin non-magnetic lining on one of the mutual facing surfaces defining said gap.

4. A device as claimed in claim 3, wherein the non-magnetic lining comprises a shim clamped between an auxiliary pole and the rotor pole piece from which the auxiliary pole piece extends.

5. A device as claimed in claim 1, which is equipped with brush-lifting mechanism including brush-application springs urging the brushes into engagement with the commutator, a brush-lifting element that is biassed by said brush-lifting spring means to a position of engagement with the brush-lifting mechanism to lift the brushes off the commutator against the action of said brush-application springs, said brush-lifting element being so connected operatively to the rotor member of the rotary solenoid that, when the rotary solenoid is energised, said rotor member moves the brush-lifting element against the action of said brush-lifting spring means so as to allow said brush-application springs to move the brushes into contact with the commutator by the application springs.

* * * * *